March 23, 1937.   J. H. CORDES   2,074,367
CARBURETOR
Filed Feb. 10, 1934   2 Sheets-Sheet 1

Inventor
John H. Cordes
by Lippsey & Kingsland
His Attorneys

March 23, 1937.  J. H. CORDES  2,074,367
CARBURETOR
Filed Feb. 10, 1934   2 Sheets-Sheet 2
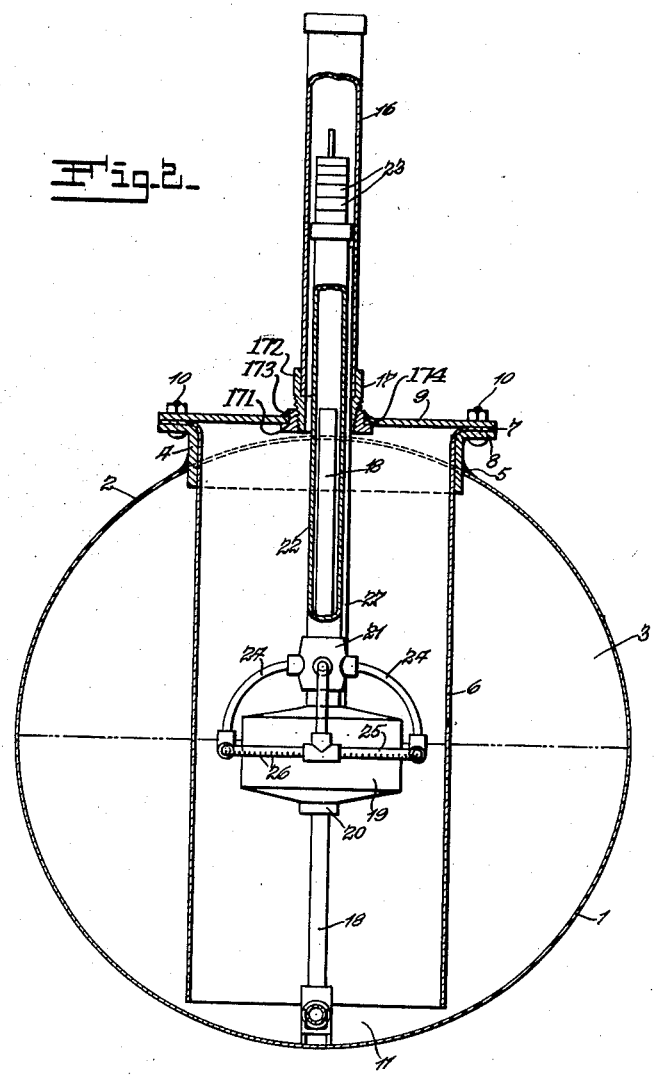
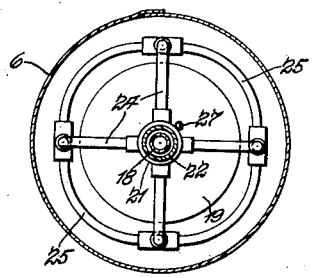

Patented Mar. 23, 1937

2,074,367

UNITED STATES PATENT OFFICE 2,074,367

CARBURETOR

John H. Cordes, St. Louis, Mo., assignor to Adelia M. Cordes, St. Louis, Mo.

Application February 10, 1934, Serial No. 710,624

6 Claims. (Cl. 261—120)

This invention relates to carburetors, and has special reference to improved means for impregnating a volatile fluid, such as gasoline, with air in order to produce a combustible carbureted mixture.

An object of the invention is to provide an improved carburetor comprising a tank adapted to receive and contain the volatile fluid and having means for delivering the fluid into the tank and conducting the gas or carbureted mixture therefrom, in combination with a shell extending downwardly into the tank and terminating at a distance above the bottom of the tank to permit the fluid to enter and rise within the shell, a pipe for conducting and discharging air into the shell above the fluid, and a device supported and controlled by the fluid in the shell for discharging air into the body of the fluid below the upper surface thereof in the shell in order to produce a carbureted mixture.

Another object of the invention is to provide a float device mounted within the shell and supported and controlled by the fluid and having means whereby the air pressure within the tank and within the float are equalized in order to prevent crushing of the float device, and means supported by the float device for discharging air into the body of the fluid within the shell irrespective of considerable variation in the amount of fluid contained in the tank and in the shell.

Various other objects and advantages of the invention will be apparent from the following description, reference being made to the annexed drawings, in which—

Fig. 2 is a vertical sectional view on the line 2—2 of Fig. 1.

Fig. 3 is a transverse sectional view approximately on the line 3—3 of Fig. 1.

Figure 1:
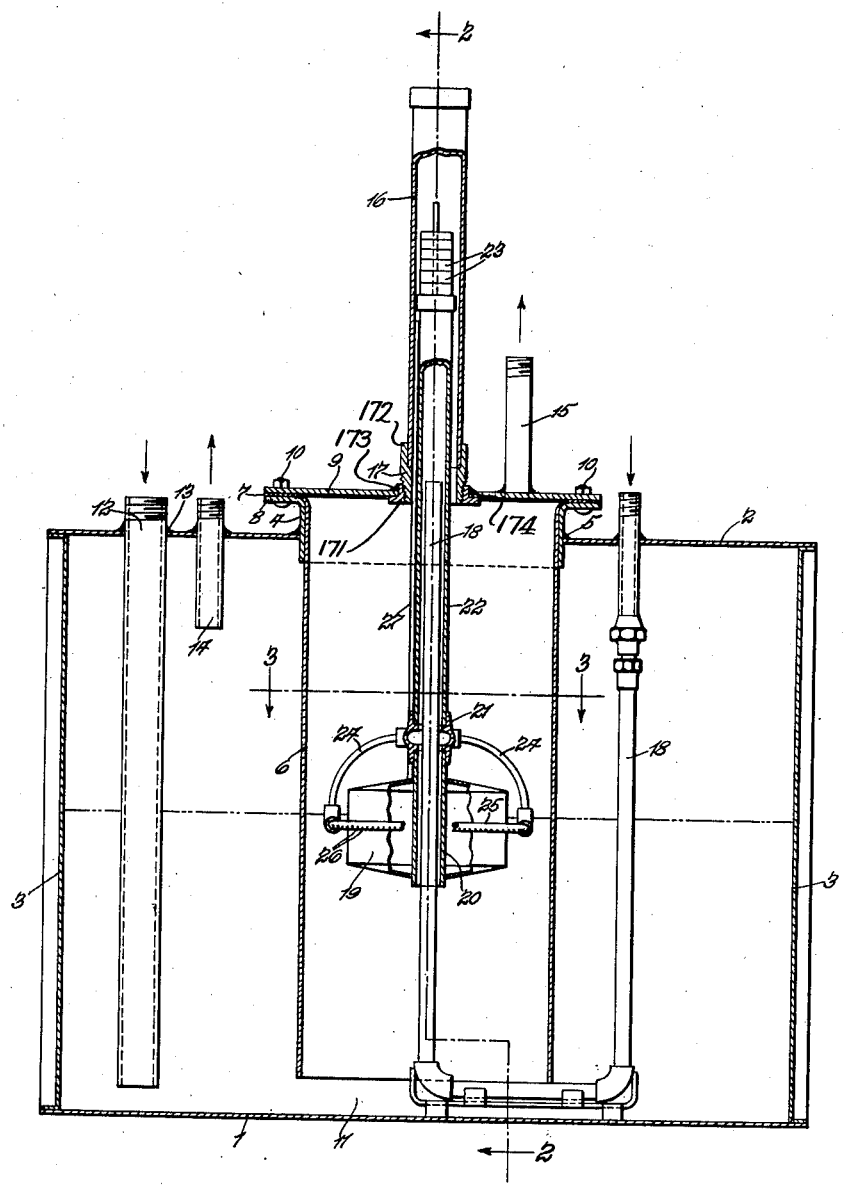
Fig. 1 is a vertical sectional view of one embodiment of the invention.

In the embodiment of the invention shown, the tank comprises a cylindrical wall forming a bottom 1 and a top 2 and end walls 3 having leakproof connection with the cylindrical wall. A sleeve 4 is mounted in an opening in the top wall 2 of the tank and attached thereto by solder 5, or other appropriate jointing means. A cylindrical shell 6 has its upper end extending through the sleeve 4 and provided with an outwardly flared marginal portion 7 seated upon an outwardly flared marginal portion 8 at the upper end of said sleeve 4. A top wall 9 is seated on the outwardly flared marginal portion 7 of the shell and is attached to the parts 7 and 8 by fasteners 10 forming an impervious leak-proof joint therewith. The lower end of the shell 6 terminates above and is separated from the bottom wall 1 of the tank by a space 11 which permits fluid in the tank to rise freely within the shell 6.

A filler pipe 12 extends through a hole in the top wall 2 of the tank and is attached thereto by solder, or other appropriate joint forming means 13, so that there will be no leakage of air or gas around the pipe. An additional pipe section, or other conduit, not shown, may be attached to the upper end of the pipe 12. The lower end of the pipe 12 terminates a slight distance above the bottom wall 1 of the tank. A vent device 14 opens through the top wall 2 of the tank in order to admit and discharge air and prevent vacuum.

A gas outlet pipe 15 opens through the top wall 9 of the shell and may be connected with service tubes or pipes.

A pipe 16 has its lower end attached to a fitting 17 opening through and forming an impervious joint with the wall 9. The fitting 17 comprises an outer internally threaded flanged sleeve 171 and an inner externally threaded sleeve 172. The sleeve 171 fits through an opening 174 in the wall 9, and has its flange abutting the inner surface thereof, the sleeve being externally welded, or otherwise fixed, to the top 9 at 173. The sleeve 172 screws into the sleeve 171 by means of the aforesaid threads, so that it and its associated pipe 16 are removable from the assemblage as a unit for the purpose of removing or inserting weight elements to be referred to below.

An air supply pipe 18 extends through and forms an impervious joint with the wall 2. This pipe 18 extends downwardly to a point near the bottom wall 1 of the tank and thence laterally and upwardly into the shell 6, having its open upper end above the top wall 2 of the tank and, as shown, above top wall 9 of the shell.

A hollow shell 19, forming a float that will be sustained by the fluid, is attached to a tube member 20 that opens axially and vertically through the float shell and has its upper end attached to and opening into a fitting or connecting member 21, the upper end of which fitting or connecting member is attached to the lower end of a tube 22 extending upwardly through the fitting 17 and into the pipe 16 and having its upper end closed and supporting a number of removable and replaceable and interchangeable weight elements 23 by variations of which the position of the float 19 in the body of liquid and with respect to the upper surface of the body of liquid may be varied. This is to say that the devices 23 constitute means for holding the float member 19 submerged to any desired extent within the liquid that rises in the shell 6.

The air supply pipe 18 extends upwardly through the tubular member 20, the fitting or connecting member 21 and the tube 22 and does not interfere with the vertical movements of said parts under control of the fluid that enters the shell 6.

A number of tubes 24 have their upper ends opening into the fitting or connecting member 21 and their lower ends opening into an endless spray pipe device 25 extending around the float member 19 and having numerous openings 26 for the ejection of air into the fluid within the shell 6.

A tube 27 has its lower end opening into the float member 19 and extends upwardly into the pipe 16 and is open throughout its length, so that there is free passage of air into and from the float member 19. Thus, the air pressure within the shell 6 is always approximately equalized with the air pressure in the float member 19 and vice versa.

In operation, the tank is filled or partially filled with a volatile fluid, such as gasoline. Air is pumped or otherwise forced through the pipe 18 and discharged into the tube 22. From the tube 22 the air passes through the fitting or connecting member 21, through the tubes 24 and into the spray pipe device 25 and through the holes 26 into the body of the fluid because the weight of the parts connected with the float member 19 is sufficient to hold the spray pipe device 25 submerged in the fluid.

In this way a combustible carbureted mixture is produced which may be conducted to any place of use through the pipe 15 and the connections therefrom.

Further, the pressure within the float member 19 is sufficiently equalized with the pressure in the shell 6 to prevent compression of and damage to the float member, such equalization of pressure being obtained through the tube 27.

During the time that gasoline is being delivered into the tank through the filler pipe 12, the gas outlet pipe 15 and air supply pipe 18 are closed and kept closed by valves in connection with extensions thereof that are not illustrated in the drawings. When the gasoline rises in the tank slightly above the lower end of the vent device 14, it becomes impossible for air or gas within the tank above the liquid to pass out because all outlets are sealed or closed. Therefore, it becomes impossible for the tank to be filled with liquid appreciably above the lower end of the vent device 14, said vent device constituting a guard or gage to prevent an excessive amount of liquid from being discharged into the tank. The end of the pipe 18, as shown, is well above the plane of the lower end of the vent device 14, which makes it impossible for liquid to enter the pipe 18.

This invention may be manufactured, distributed and installed at permissible cost and is free from complicated and undesirable features of construction. The invention may be varied within the scope of equivalent limits without departure from the nature and principle thereof.

I claim:

1. A carburetor comprising a tank adapted to contain a volatile fluid, a shell extending downwardly into said tank and having its lower end open to admit fluid from said tank into said shell, a float device mounted in said shell for vertical operation by the fluid therein, an air spray device supported by said float device below the level of the fluid that will support said float device, a pipe extending upwardly into said shell for discharging air into said shell, and a vent tube extending downwardly into said tank below the upper end of said pipe and constituting a guard or gage to prevent fluid from rising in said tank and in said shell above a predetermined point on said pipe.

2. In a device of the kind described, a tank adapted to contain liquid, a shell removably connected to and adapted to extend downwardly into said tank and the interior of said shell being in communication therewith adjacent the bottom of the shell, a float within the shell, an extension on said float and extending above the top of the shell and above the liquid level of the tank, means on said extension to vary the depth of immersion of said float, a cover over said shell including a removable extension surrounding said float extension, said cover extension being removable to give access to said immersion varying means.

3. In a device of the kind described, a conduit, a float having a passage through the center thereof through which the conduit extends, said conduit and float being secured together at said passage, said float having side walls and a bottom wall, said conduit terminating in an outlet below said bottom wall, a spray element surrounding said float at an elevation between the top and bottom of said side walls, a plurality of pipes extending outwardly and downwardly from said conduit to said element in external relation to the float, being connected to said element at spaced points therearound, whereby to place said conduit in communication with said element, and to support said element on said conduit.

4. In a device of the kind described, a tank adapted to contain liquid, a shell removably suspended in the tank, a float in said shell, a conduit on said float extending upwardly therefrom and being closed at the top said shell having a removable top with an opening therein, a pipe removably associated with said opening and extending upwardly therefrom, said conduit being adapted to extend into said pipe as a partial guide in vertical movement of the float, and a pipe connecting the upper end of said pipe with the interior of said float whereby the pressure inside the float may be equalized with that in the conduit pipe and conduit to present crushing the float under pressure in the shell.

5. A carburetor comprising a tank adapted to contain a volatile fluid, a shell extending downwardly into said tank having its lower end open to receive fluid from said tank and having a flange at its upper end, a float device in said shell, means for guiding said float device in its vertical movements, an air ejector supported by said float device below the surface of the fluid that supports said float device, means for conducting air into said ejector in any of the vertical positions thereof, the top enclosure for said tank having an opening to receive said shell, a flanged sleeve fixed in said opening and extending upwardly above the top closure and disposed to receive the flange of the shell in superposed relation on the sleeve flange, and a closure member for the shell removably connected to the superposed flanges by means adapted to tightly bind the flanges and member together.

6. In a device of the kind described, a tank to contain liquid, a shell removably suspended within said tank in vertical position, said shell being open at the bottom to permit liquid in the tank to flow therein, a liquid inlet pipe, a vent and level limit pipe and an air inlet pipe each extending into the tank, a float within the shell having a conduit running therethrough and extending upwardly therefrom, a cover on the shell raised from the tank, a pipe rising from the cover in removable relation thereto and opening into the shell, said conduit extension rising into the pipe as a partial guide, said air pipe extending beneath the shell and up into the conduit to open therein at a point well above the maximum float level, depth control means for the float on the conduit extension in the pipe, a spray element extending around the float and adapted to be immersed at all times, leads from the conduit to the spray element, an air connection between the shell and the interior of the float, and a pipe entering the shell to convey carbureted air to a source of use or storage.

JOHN H. CORDES.